US009843087B2

(12) United States Patent
Chong et al.

(10) Patent No.: US 9,843,087 B2
(45) Date of Patent: Dec. 12, 2017

(54) METHODS AND DEVICES FOR PROTECTING ANTENNA COMPONENTS FROM CONTAMINANTS

(71) Applicant: Radio Frequency Systems Inc., Meriden, CT (US)

(72) Inventors: Yin-Shing Chong, Middletown, CT (US); Peter Casey, Clinton, CT (US); Yunchi Zhang, Wallingford, CT (US)

(73) Assignee: Alcatel-Lucent Shanghai Bell Co Ltd., Shanghai (CN)

( * ) Notice: Subject to any disclaimer, the term of this patent is extended or adjusted under 35 U.S.C. 154(b) by 0 days.

(21) Appl. No.: 15/584,362

(22) Filed: May 2, 2017

(65) Prior Publication Data
US 2017/0250454 A1 Aug. 31, 2017

Related U.S. Application Data

(63) Continuation-in-part of application No. 13/780,293, filed on Feb. 28, 2013, now Pat. No. 9,640,853.

(51) Int. Cl.
| | |
|---|---|
| *H01Q 1/00* | (2006.01) |
| *H01P 11/00* | (2006.01) |
| *F16J 15/32* | (2016.01) |
| *F16J 15/08* | (2006.01) |
| *H01P 1/161* | (2006.01) |
| *F16J 15/06* | (2006.01) |
| *F16J 15/3268* | (2016.01) |

(52) U.S. Cl.
CPC .............. *H01P 11/00* (2013.01); *F16J 15/32* (2013.01); *F16J 15/06* (2013.01); *F16J 15/0818* (2013.01); *F16J 15/3268* (2013.01); *H01P 1/161* (2013.01)

(58) Field of Classification Search
CPC ....................................................... H01Q 1/38
USPC ......................................................... 343/907
See application file for complete search history.

(56) References Cited

U.S. PATENT DOCUMENTS

| | | |
|---|---|---|
| 6,560,850 B2 | 5/2003 | St. John et al. |
| 7,193,491 B2 | 3/2007 | Leadley-Brown et al. |
| 2002/0144392 A1 | 10/2002 | John et al. |
| 2008/0058036 A1 | 3/2008 | Nibe |

FOREIGN PATENT DOCUMENTS

| | | |
|---|---|---|
| EP | 1705144 A1 | 9/2006 |
| WO | WO 2010/053705 A1 | 5/2010 |

*Primary Examiner* — Graham Smith
(74) *Attorney, Agent, or Firm* — The Capitol Patent & Trademark Law Firm, PLLC (57) ABSTRACT

Sealing portions of an orthomode transducer or another antenna component is accomplished by forming first and second receptacles or channels in one half or portion of the transducer and inserting first and second type of compressible sealing components into the receptacles. Upon attaching additional portions of the transducer the compressible sealing components may be compressed, but the compression is limited to an amount within a compression range to maintain a seal.

15 Claims, 6 Drawing Sheets

METHODS AND DEVICES FOR PROTECTING ANTENNA COMPONENTS FROM CONTAMINANTS

RELATED APPLICATION

The present application is a continuation-in-part of U.S. patent application Ser. No. 13/780,293 filed Feb. 28, 2013 (the "293 Application"). To the extent applicable, the present application claims the benefit of priority from the '293 Application. The present application incorporates by reference herein the complete disclosure of, including the text and figures, the '293 Application as if set forth in full herein.

BACKGROUND

Today's wireless networks use sophisticated radio-frequency (RF) and microwave frequency antennas to transmit and receive voice, video and data communications. Such antennas may also be used as part of a wired network's infrastructure. Many, if not most, antennas are placed outdoors on top of antenna towers or tall structures (e.g., buildings). As such, antennas are subject to weather conditions, including rain, wind, snow and humidity. Generally speaking, an antenna may consist of a number of components which are connected together. For an, antenna to work properly it is important to prevent water, humidity, other types of moisture and fine particulate, e.g., dust (collectively referred to as "contaminants") from leaking, seeping or otherwise infiltrating into the antenna. Typically, unwanted contaminants may enter into an antenna at the junction of two or more antenna components. To prevent this from occurring, a sealant or a customized, a pre-formed gasket may be used at the junction (i.e., in between) of components. In a typical antenna a number of gaskets may be used. While effective, traditional gaskets require specialized molds that are expensive to create and use. In addition, during the design and development of a new antenna the need to design customized molds for each gasket adds to the time required to test and finalize a particular antenna design. Similarly, if a particular antenna design needs to be modified so too must the gaskets and their associated, customized molds further adding to the time and expense of designing and developing, an antenna.

Accordingly, it is desirable to provide antennas that are sealed from the infiltration of contaminants and related methods for preventing such infiltration from occurring.

SUMMARY

Exemplary embodiments of antennas and methods for protecting antennas and antenna components from contaminants, are disclosed.

In one embodiment of the invention, an antenna component, such as an orthomode transducer, or a section of such a transducer, may comprise: a first portion that comprises one or more first receptacles), each configured to receive a first type of compressible sealing component, and one or more second receptacles, each substantially perpendicular to one or more of the first receptacles, and each configured to receive a second type of compressible sealing component and to create at least one point of contact at a shoulder shaped point of contact between a first and second type of compressible sealing component. The antenna component may further comprise one or more of the first type of compressible sealing components (e.g. corded O-rings) and one or more of the second type of compressible sealing components (e.g., O-rings). In one embodiment, the two types of sealing components are different; in another embodiment the two components are the same. In yet a third embodiment, the first and second type of compressible sealing components may comprise a unitary, compressible sealing component.

In addition to a first portion, the antenna component may further comprise a second portion configured to be connected to the first portion in a same plane as the, one or more first receptacles, and one or more third portions (e.g., side waveguide portions) configured to be connected to the first portion and the second portion in a same plane as the one or more second receptacles.

To assure that contaminants and the like do not infiltrate the antenna component, in one embodiment each of the first receptacles and an associated first type of sealing component are further configured to compress the second type of sealing component by an amount within a compression range to maintain a seal at a point of contact at the shoulder shaped point of contact between the first and second type of compressible sealing components. The compression range may comprise a range of 20% to 35% of an uncompressed, cross sectional diameter of the second type of compressible sealing component.

In alternative embodiments of the invention, an antenna component may comprise first, second and third portions. In particular, one alternative component may comprise: a first portion that itself comprises one or more first receptacles, each configured to receive a first type of compressible sealing component, and one or more second receptacles, each substantially perpendicular to one or more of the first receptacles, and each configured to receive a second type of compressible sealing component and to create at least one point of contact at a shoulder shaped point of contact between a first and second type of compressible sealing component; and a second portion configured to be connected to the first portion in a same plane as the one or more first receptacles. A second alternative component may comprise the first and second portions set forth above and, in addition, one or more third portions configured to be connected to the first portion and second portion in a same plane as one or more of the second receptacles.

The present invention also includes novel methods for providing a seal between antenna components. One method comprises: forming one or more first receptacles, each configured to receive a first type of compressible sealing component, in a first portion of an antenna component, and forming one or more second receptacles in the first portion, each substantially perpendicular to one or more of the first receptacles, and each configured to receive a second type of compressible sealing component and to create at least one point of contact at a shoulder shaped point of contact between a first and second type of compressible sealing component. The method set forth above may include one or more additional steps, such as: inserting one or more of the first type of compressible sealing components and one or more of the second type of compressible sealing components into the first and second receptacles, and connecting a second portion of the antenna component to the first portion in a same plane as the one or more first receptacles.

In an additional embodiment, the method may yet further comprise connecting one or more third portions to the first portion and second portion in a same plane as one or more of the second receptacles.

To assure that contaminants and the like do not infiltrate the antenna component, in another embodiment the method may comprise compressing the second type of sealing component by an amount within a compression range to maintain a seal at a point of contact at a shoulder shaped point of contact between the first and second type of compressible sealing components, where the range may comprise 20% to 35% of an uncompressed, cross sectional diameter of the second type of compressible sealing component.

Additional features and embodiments of the inventions will be apparent from the following detailed description and appended drawings.

DETAILED DESCRIPTION, INCLUDING EXAMPLES

Exemplary embodiments (i.e., examples) of an antenna, antenna components and related methods are described herein in detail and shown by way of example in the drawings. Throughout the following description and drawings, like reference numbers/characters shall refer to like elements.

It should be understood that although specific structural and functional details are discussed herein for purposes of describing the exemplary embodiments, there is no intent to limit the scope of present invention to such embodiments. Practically speaking, it is next to impossible for the inventors to describe each and every variation of the inventive methods and devices. Thus, it should be understood that the exemplary embodiments discussed herein are for illustrative purposes, and that varied, modified, equivalent and alternative embodiments may be implemented without departing from the scope of the present invention.

It should be noted that some exemplary embodiments are described as processes or methods depicted in flowcharts. Although the flowcharts may describe the processes/methods as sequential, many of the processes/methods may be performed in parallel, concurrently or simultaneously. In addition, the order of each step within a process or method may be re-arranged. The processes/methods may be terminated when completed, may also include additional steps not included in a particular flowchart and/or may correspond to functions, procedures, subroutines, subprograms, etc completed by an antenna, antenna component and/or antenna system.

It should be further understood that, although the terms first, second, third, etc, may be used herein to describe various elements, the elements should not be limited by these terms. Such terms are used to distinguish one element from another. For example, a first element could be termed a second element, and, similarly, a second element could be termed a first element, without departing from the scope of disclosed embodiments. As used herein, the term "and/or" includes any and all combinations of one or more of associated or listed items. It should be understood that when an element is referred to as being "connected" or "attached" to another element, it may be directly connected or attached to the other element, or intervening elements, may be present, unless otherwise specified. Additional words used to describe connective or spatial relationships between elements or components (e.g., "between") should be interpreted in a like fashion. As used herein, the singular forms "a," "an" and "the" are not intended to include the plural form, unless the context clearly indicates otherwise.

Figure 1:
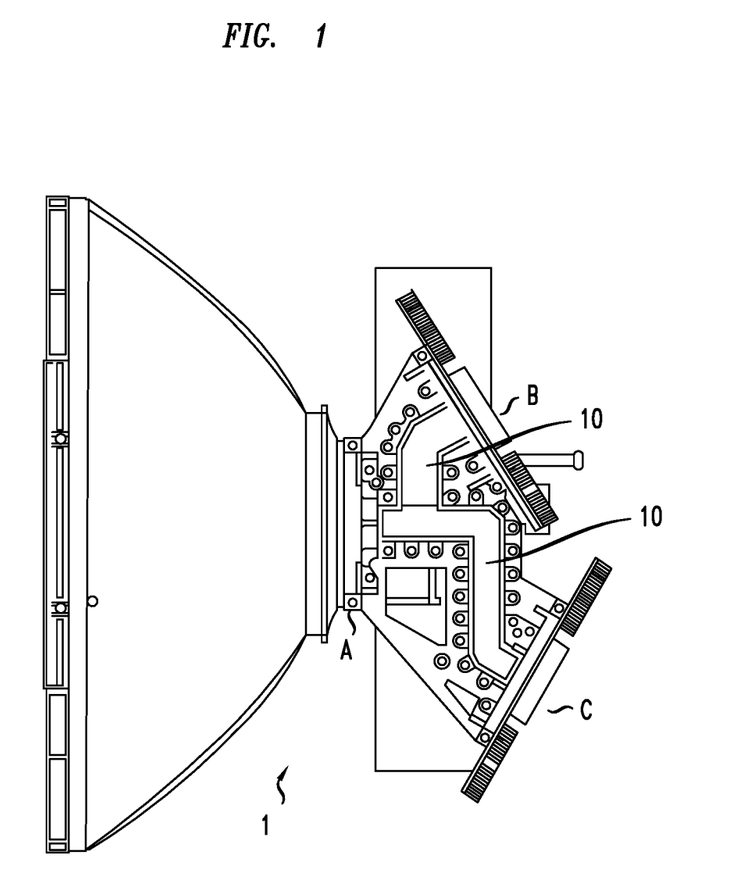
FIG. 1 depicts an antenna according to one embodiment of the present invention.

Turning now to the figures, FIG. 1 depicts an exemplary antenna 1 for a communication system according to an embodiment. The antenna 1 may be, for example, a very small aperture terminal (VSAT) antenna or a terrestrial microwave radio antenna, operating over the range of 6 to 80 gigahertz, to name a few examples. As shown in FIG. 1, the antenna 1 comprises an antenna component 10 and transmitter 100. In an embodiment of the invention, the component 10 may comprise an orthomode transducer, or a section of an orthomode transducer, for example. As is known in the art, orthomode transducers are typically used to either to combine, or separate, two microwave signal paths. One of the paths may form an uplink and the other a downlink. Both paths may use the same transducer 10. Three surfaces of the component 10 are labeled A, B and C, respectively.

Figure 2A:
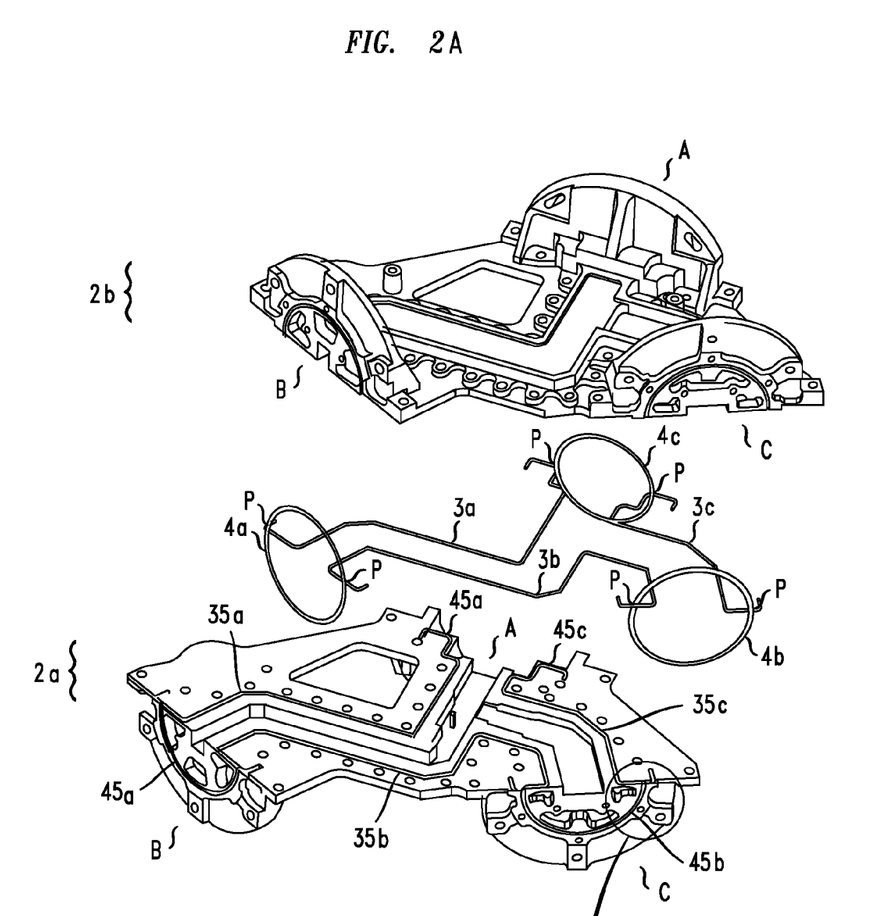
FIG. 2A depicts an exploded view of a component that may be used in the antenna depicted in FIG. 1 according to an embodiment of the present invention.

FIG. 2A depicts an "exploded" view of the antenna component 10 shown in FIG. 1. As shown component 10 may comprise two portions 2a, 2b. For ease of understanding the portion designated as 2a will be referred to as a "first" or bottom portion while the portion designated as 2b will be referred to as a "second" or upper portion, it being, understood that the numbering and orientation of the portions may be reversed.

In an embodiment of the invention the first, portion 2a may comprise one or more first receptacles or channels 35a, 35b, 35c (sometimes referred to as "glands"), each configured to receive an associated, first type of compressible sealing component 3a, 3b, 3c. The sealing components 3a, 3b, 3c may comprise corded O-rings, for example. In addition, the first portion 2a may further comprise one or more second receptacles or channels 45a, 45b, 45c, each, substantially perpendicular to one or more of the first receptacles 35a, 35b, 35c, and each configured to receive a second type of compressible sealing component 4a, 4b, 4c. In an embodiment of the invention the second type of sealing component may comprise an O-ring, for example. As shown in the embodiment shown in FIG. 2A the component 10 may comprise a plurality of the first type of compressible sealing components and a plurality of the second type of compressible sealing components, it being understood that the component 10 includes at least one or more of each type of compressible sealing component.

Figure 2B:
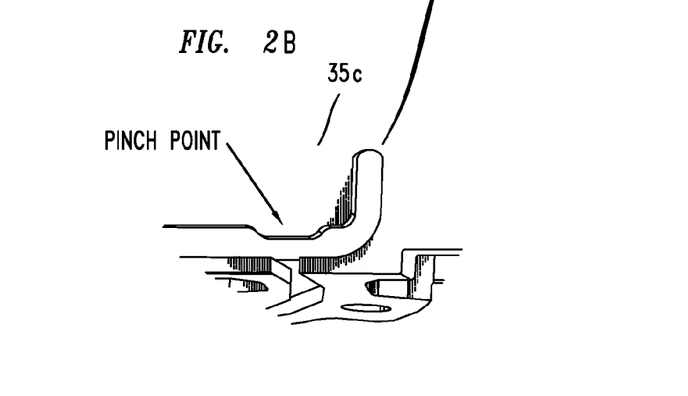
FIG. 2B depicts an enlarged view of a portion of the component depicted in FIG. 2A.

Yet further, the configuration of each of the first and second receptacles within the first portion 2a is operable to create at least one point of contact at the point "P" on a first and second type of compressible sealing component (see FIG. 2B, for example, which is an enlarged portion of an exemplary configuration that includes a "shoulder" shaped portion at point "P"). In more detail, as shown in FIG. 2A and 2B positions at, which a first type of compressible sealing, component makes contact with a second type of compressible sealing component is also labeled "P." Contact occurs, for example, after the two types of sealing components are received into their respective, associated receptacles and the first and second portions are connected or otherwise joined together (see FIGS. 3A and 3B). In an embodiment of the invention the second portion 2b may be configured to be connected to the first portion 2a in a same plane as the one or more first receptacles. The exemplary configurations shown in FIGS. 2A and 2B generate a force on the first type of compressible sealing components, causing them to bulge somewhat at points P. When third portions (e.g., covers) (not shown in FIG. 2) are placed on top of the second type of compressible sealing components 4a, 4b, 4c at surfaces A, B and C (see FIG. 1) the second type of compressible sealing components come in contact with the bulging sections of the first type of compressible sealing components at points P, causing the second type of compressible sealing components to deform at points P (or vice-versa, i.e., the second type of sealing component causes the first type to deform). More generally, the point of contacts at points P occur when one or more third portions (e,g., side waveguide portions) are configured to be connected to the first portion 2a and a second portion 2b in a same plane as the one or more second receptacles 45a, 45b, 45c at surfaces A, B and C.

Before going further it should be noted that although the second receptacles 45a, 45b, 45c are shown as semi-circular receptacles this is only one exemplary shape. Other shapes may be configured without departing from the scope of the present invention. Yet further, to the extent that the discussion above and below discusses receptacles that are configured to receive a type of compressible sealing component the inventors note that this phrase includes the state wherein the receptacles have not yet received a sealing component but are configured to do so (e.g., when the two portions 2a, 2b are separate, or when the third portions are not connected) as well as the state wherein sealing components are fully received by receptacles.

Continuing, in an embodiment of the invention, the configuration of each one of the first receptacles and an associated first type of sealing component depicted in FIGS. 2A and 2B may compress a second type of sealing component by an amount within a compression range to maintain a seal at a point of contact P on the first and second type of compressible sealing components. Said another way, in an embodiment of the invention a bulging section of a first type of compressible sealing component may cause a second type of compressible sealing components to deform at a point P (or vice-versa) by an amount within a compression range that maintains a seal at a point P. This compression range may comprise a range of 20% to 35% of an uncompressed, cross sectional diameter of the second type of compressible sealing component, for example.

Though the first and second type of compressible sealing components depicted in FIG. 2A are different types (i.e., corded O-rings versus O-rings) and shapes, this need not be the case. In an alternative embodiment the two types of sealing components may be the same type, same shape or same type and shape.

Figure 3A:
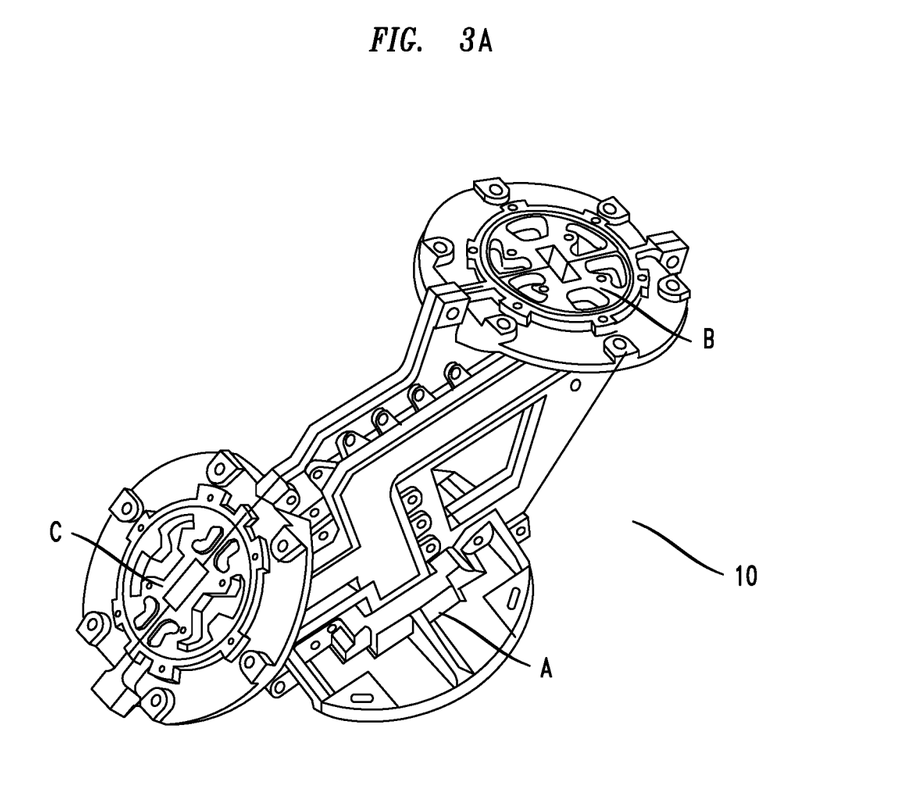
FIG. 3A depicts a view of the component depicted in FIG. 2 according to an embodiment of the present invention.
Figure 3B:
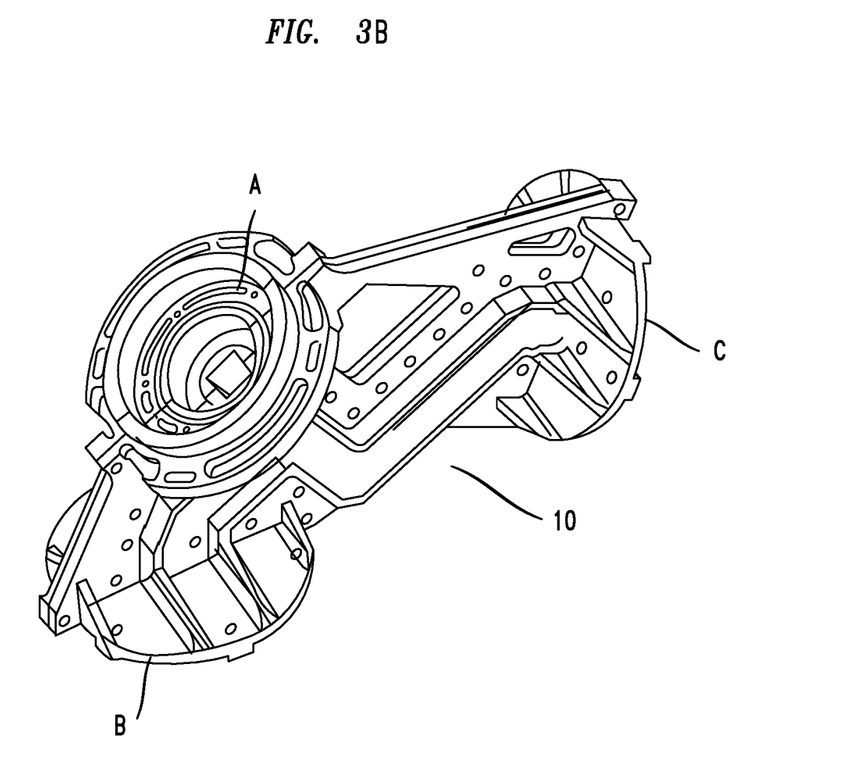
FIG. 3B depicts another view of the component depicted in FIG. 2 according to an embodiment of the present invention.

FIGS. 3A and 3B depict views of antenna component 10. As shown, the component 10 comprises a unified component (i.e., both the first and second components 2a, 2b are attached or otherwise connected together). The view in FIG. 3A mainly shows a view of surfaces B and C while FIG. 3B mainly shows a view of surface A.

Figure 4:
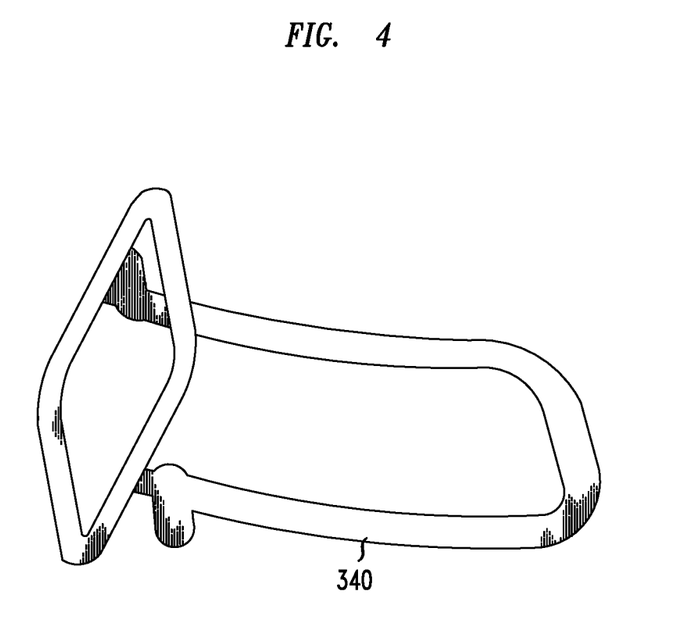
FIG. 4 depicts a compressible sealing component that a may be used in the component depicted in FIGS. 1 through 3B according, to an additional embodiment of the present invention.

Referring now to FIG. 4 there is depicted an alternative type of compressible sealing component 340. As shown the component 340 comprises a unitary, compressible sealing component. Instead of using separate, first and second compressible sealing components as shown in FIG. 2A, in this embodiment the functions of both the first and second compressible sealing components are combined into a single, unitary compressible sealing component.

Figure 5:
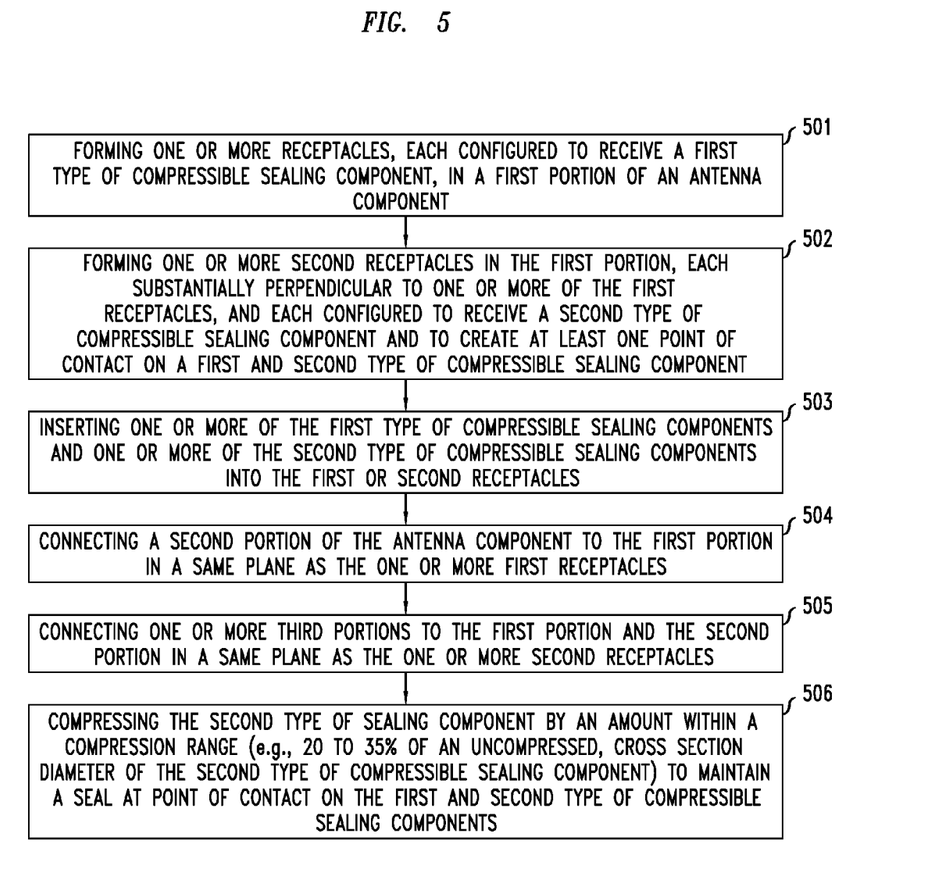
FIG. 5 depicts a flow diagram of an exemplary method according to one or more embodiments of the invention.

The discussion above has focused on exemplary devices made in accordance with principles of the present invention. In addition, various methods of providing such devices are also within the scope of the invention, For example, FIG. 5 depicts steps in one or more exemplary methods for providing a seal between antenna components according to the present invention. One such method may comprise: forming one or more first receptacles, each configured to receive a first type of compressible sealing component, in a first portion of an antenna component (step 501); and forming one or more second receptacles in the first portion, each substantially perpendicular to one or more of the first receptacles, and each configured to receive a second type of compressible sealing component (e.g., O-ring) and to create at least one point of contact on a first and second type of compressible sealing component (step 502). In addition, such a method may further comprise inserting one or more of the first type of compressible sealing components and one or more of the second type of compressible sealing components into the first and second receptacles (step 503), connecting a second portion of the antenna component to the first portion in a same plane as the one or more first receptacles (step 504), and connecting one or more third portions (e.g., side waveguide portions) to the first portion and a second portion in a same plane as the one or more second receptacles (step 505). Yet further, the method may alternatively include compressing the second type of sealing component (O-ring) by an amount within a compression range (e.g., 20 to 35% of an uncompressed, cross sectional diameter of the second type of compressible sealing component) to, maintain a seal at a point of contact on the first and second type of compressible sealing components (step 506).

While exemplary embodiments have been shown and described herein, it should be understood that variations of the disclosed embodiments may be made without departing from the spirit and scope of the claims that follow.

We claim:

1. An antenna component comprising:
   a first portion comprising,
      a first gasket channel configured to receive a first compressible sealing component, and
      a second gasket channel, the second gasket channel being about perpendicular to the first gasket channel and configured to receive a second sealing component; and
   a third portion configured to be connected to the first portion and a second portion in a same plane as the, second gasket channel,
   wherein the first gasket channel is further configured to compress the second sealing component by an amount within a compression range to maintain a seal at a shoulder shaped point of contact between the first and second compressible sealing components when said first and third portions are connected.

2. The antenna component as in claim 1 further comprising the first compressible sealing component located within said first gasket channel and the second compressible sealing component located within said second gasket channel.

3. The antenna component as in claim 1 further comprising the second portion of the antenna component, wherein the second portion comprises:
 a third gasket channel that matches the first gasket channel of the first portion and is configured to receive the first compressible sealing component.

4. The antenna component as in claim 1, wherein said third portion comprises a gasket channel that matches the second gasket channel of the first portion and is configured to receive the second compressible sealing component.

5. The antenna component as in claim 2 wherein the second compressible sealing component is compressed by 20% to 35% of an uncompressed, cross sectional diameter of the second compressible sealing component at said point of contact when the first, second and third portions are joined.

6. The antenna component as in claim 2 wherein the first sealing component comprises an elongated O-ring cord and the second sealing component comprises an O-ring.

7. The antenna component as in claim 2 wherein the first and second compressible sealing components comprise a same type of sealing component.

8. The antenna component as in claim 1 wherein the first portion is a portion of an orthomode transducer.

9. A method for providing a seal in an antenna component, comprising:
 providing a first compressible sealing component and a second separate compressible sealing component;
 providing a first portion of said antenna component, said first portion having 1) a first gasket channel configured to receive said first sealing component, and 2) a second gasket channel being about perpendicular to said first gasket channel and configured to receive said second sealing component;
 joining a third portion of said antenna component to said first portion and a second portion, of said antenna component in a same plane as the second gasket channel,
 wherein said first sealing component is located within said first gasket channel and said second sealing component is located within said second gasket channel, and
 said second sealing component is compressed by an amount within a compression range to form a seal at a shoulder-shaped point of contact between said first and second sealing components.

10. The method as in claim 9, wherein said second portion includes a gasket channel that matches the first gasket channel of the first portion and is configured to receive the first compressible sealing component.

11. The method as in claim 9 further, wherein said third portion includes a gasket channel that matches the second gasket channel is and configured to receive the separate, second compressible sealing component.

12. The method as in claim 9, wherein the second compressible sealing component is compressed at said point of contact by 20% to 35% of an uncompressed, cross sectional diameter of the second compressible sealing component.

13. The method as in claim 9 wherein the first sealing component comprises an O-ring cord and the second sealing component comprises an O-ring.

14. The method as in claim 9 wherein the first and second compressible sealing components comprise a same type of sealing component.

15. The method as in claim 9 wherein the first and second antenna components are components of an orthomode transducer.

\* \* \* \* \*